US 9,476,510 B2
(45) Date of Patent: Oct. 25, 2016

(54) DIAPHRAGM VALVE

(71) Applicant: FESTO AG & Co. KG, Esslingen (DE)

(72) Inventor: Andreas Buhler, Stuttgart (DE)

(73) Assignee: FESTO AG & CO. KG, Esslingen (DE)

( * ) Notice: Subject to any disclaimer, the term of this patent is extended or adjusted under 35 U.S.C. 154(b) by 139 days.

(21) Appl. No.: 14/384,511

(22) PCT Filed: Mar. 11, 2013

(86) PCT No.: PCT/EP2013/000715
§ 371 (c)(1),
(2) Date: Sep. 11, 2014

(87) PCT Pub. No.: WO2013/135366
PCT Pub. Date: Sep. 19, 2013

(65) Prior Publication Data
US 2015/0041691 A1 Feb. 12, 2015

(30) Foreign Application Priority Data

Mar. 14, 2012 (DE) .................. 10 2012 005 093

(51) Int. Cl.
*F16K 31/06* (2006.01)
*F16K 7/12* (2006.01)
*F16K 31/02* (2006.01)

(52) U.S. Cl.
CPC .................. *F16K 7/12* (2013.01); *F16K 7/126* (2013.01); *F16K 31/02* (2013.01); *F16K 31/0641* (2013.01); *F16K 31/0672* (2013.01)

(58) Field of Classification Search
CPC ...... F16K 7/12; F16K 7/126; F16K 31/0641; F16K 31/0672
USPC .................. 251/129.17, 331; 137/625.44
See application file for complete search history.

(56) References Cited

U.S. PATENT DOCUMENTS

| 3,198,205 | A | * | 8/1965 | Boteler | F16K 7/126 251/331 |
| 4,836,236 | A | * | 6/1989 | Ladisch | F16K 27/07 251/331 |
| 4,944,487 | A | * | 7/1990 | Holtermann | F16K 31/06 251/129.17 |
| 5,265,843 | A | * | 11/1993 | Kleinhappl | F16K 31/06 251/129.17 |
| 6,003,552 | A | * | 12/1999 | Shank | F16K 7/16 137/625.44 |
| 6,394,417 | B1 | * | 5/2002 | Browne | F16K 7/12 251/331 |
| 6,609,698 | B1 | * | 8/2003 | Parsons | F16K 7/14 251/129.17 |
| 6,789,781 | B2 | | 9/2004 | Johnson et al. | |
| 7,779,867 | B2 | | 8/2010 | Bai | |

(Continued)

FOREIGN PATENT DOCUMENTS

| DE | 7324333 | 9/1973 |
| DE | 10143887 | 4/2003 |
| DE | 20023225 | 8/2003 |
| DE | 60017310 | 1/2005 |
| DE | 102005021583 | 11/2006 |
| DE | 202009000593 | 4/2009 |
| DE | 202009016447 | 3/2010 |
| EP | 1722137 | 11/2006 |

(Continued)

*Primary Examiner* — Eric Keasel
(74) *Attorney, Agent, or Firm* — Hoffmann & Baron, LLP

(57) ABSTRACT

A diaphragm valve has a valve housing and a valve member movable relative to said housing. The valve member includes a diaphragm carrier that can be driven to execute a switchover motion having a sealing diaphragm mounted thereon, which delimits a valve chamber in which a valve seat is found. The sealing diaphragm has a sealing section opposite said valve seat belonging at least partially to a loose diaphragm section of the sealing diaphragm, which can lift from the diaphragm carrier to reduce the stress on the sealing diaphragm when said diaphragm carrier is removed from the valve seat during switching.

16 Claims, 8 Drawing Sheets

(56) References Cited

U.S. PATENT DOCUMENTS

| | | | |
|---|---|---|---|
| 7,926,785 B2 * | 4/2011 | Wincek | F16K 7/126 251/331 |
| 8,434,514 B2 * | 5/2013 | Bezold | F16K 11/022 137/625.44 |
| 2006/0289824 A1 | 12/2006 | Wincek | |

FOREIGN PATENT DOCUMENTS

| | | |
|---|---|---|
| FR | 2795798 | 1/2001 |
| GB | GB596533 | 7/1946 |
| WO | WO 99/35437 | 7/1999 |
| WO | WO 2004/005778 | 1/2004 |

* cited by examiner

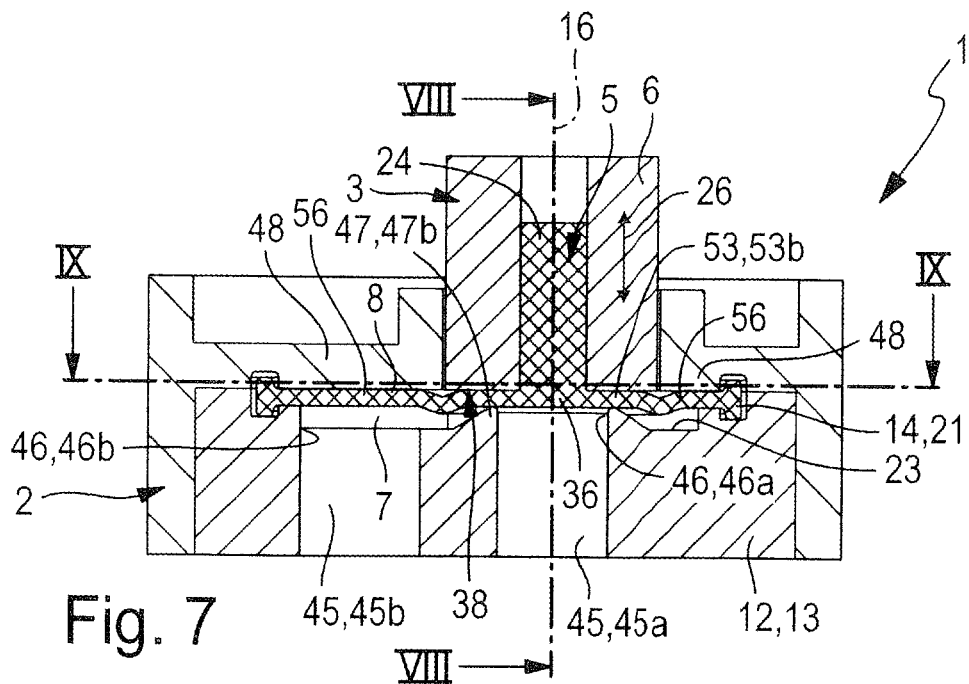
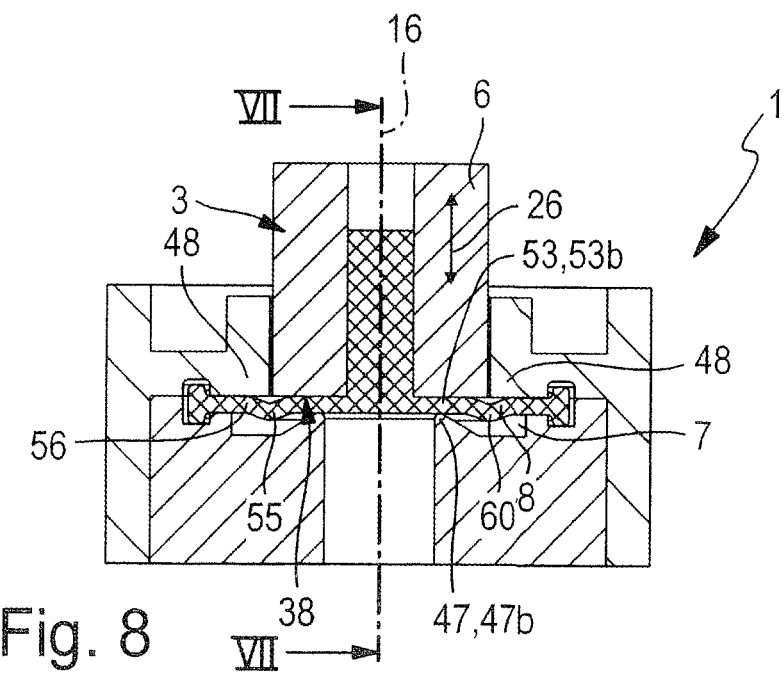

DIAPHRAGM VALVE

This application claims priority based on an International Application filed under the Patent Cooperation Treaty, PCT/EP2013/000715, filed Mar. 11, 2013, which claims priority based on German Patent Application No. DE102012005093.5, filed Mar. 14, 2012.

BACKGROUND OF THE INVENTION

The invention relates to a diaphragm valve, having a valve housing and at least one valve member movable relative to this housing, wherein the valve member has a diaphragm carrier movable relative to the valve housing through the execution of a switchover movement and also a flexible sealing diaphragm which, together with the valve housing, bounds a valve chamber, wherein the sealing diaphragm is fixed to the valve housing under sealing at its outer edge section and has a mounting diaphragm section fastened to the diaphragm carrier with clearance from said outer edge section and accompanying the switchover movement, wherein there is mounted in the valve chamber a valve seat facing the sealing diaphragm, against which a sealing section of the sealing diaphragm at least partly supported by a base surface of the diaphragm carrier facing the valve chamber may be pressed with sealing, in order to separate from one another two fluid passages opening into the valve chamber.

A diaphragm valve of this type known from EP 1 722 137 A2 contains at least one valve member, mounted in a valve housing and comprising a sealing diaphragm bounding a valve chamber, and a diaphragm carrier which carries the sealing diaphragm and is designed in the manner of a plunger and may be moved linearly relative to the valve housing. The diaphragm carrier supports with its base surface an annular sealing section of the sealing diaphragm which may be brought into contact with an annular valve seat located in the valve chamber, so as to separate from one another two fluid passages opening into the valve chamber. The sealing section is part of a diaphragm section fixed to the valve member and which may be described as the mounting diaphragm section and which accompanies the switchover movement of the diaphragm carrier. At its outer edge section the sealing diaphragm is clamped with sealing to the valve housing. A disadvantage of the known diaphragm valve lies in the fact that, during switchover of the valve member, the sealing diaphragm is for a time heavily stretched and therefore subject to great stress, which may have a disadvantageous effect on its service life.

Known from DE 20023225 U1 is a diaphragm valve of similar design, which has two valve members, each containing a diaphragm carrier designed in the manner of a plunger, and a sealing diaphragm fastened to the diaphragm carrier and cooperating with a valve seat, wherein the sealing diaphragms may be made in one piece with a diaphragm body.

DE 60017310 T2 discloses a diaphragm valve with a valve housing with a diaphragm carrier carrying a sealing diaphragm and suspended from a valve housing. With its base surface the diaphragm carrier supports two sealing sections of the sealing diaphragm, each able to cooperate with a separate valve seat in order to connect with or separate from one another altogether three fluid passages opening into a valve chamber. The switching position of the valve carrier may be preset by drive means which act on the diaphragm carrier and generate its pivoting switchover movement. With this diaphragm valve too there is the problem that the flexible sealing diaphragm, especially in the diaphragm section extending between the diaphragm carrier and the fixed edge section, is heavily stretched and subject to high tensile stresses.

In the case of a diaphragm valve known from DE 20 2009 016 447 U1, a sealing diaphragm is fastened to a pivotable diaphragm carrier only in the area of two sealing sections, each opposite a valve seat. The problems of a sealing diaphragm which is heavily stressed on account of its being stretched also apply to this diaphragm valve. The same applies to the diaphragm valve described in DE 20 2009 000 593 U1, in which the diaphragm valve is pivotable in the manner of a rocker, in order to change the switching position of the valve.

A diaphragm valve known from DE 7324333 U has a sealing diaphragm which seals a valve chamber and which is held tight by a stiffening plate. Projections extending away from the sealing diaphragm pass through the stiffening plate and rest on an actuating element mounted pivotably independent of the sealing diaphragm in a valve housing. The sealing diaphragm does not take part in the pivoting movement of the diaphragm carrier, which impairs the available valve stroke.

FR 2795798 A discloses a diaphragm valve with a valve member which has a pivotable diaphragm carrier and a diaphragm body fastened to the diaphragm carrier, wherein the diaphragm body forms a sealing diaphragm, fixed in the valve housing at the edge with sealing. In pivoting of the diaphragm carrier, a diaphragm section of the sealing diaphragm bordering the diaphragm carrier is subject to high tensile stress, which can impair life expectancy.

Further types of diaphragm valve are known from U.S. Pat. No. 6,789,781 B2, WO 2004/005778 A1, GB 596533 A, DE 102005021583 A1 and U.S. Pat. No. 7,779,867 B2.

SUMMARY OF THE INVENTION

The invention is based on the problem of creating a diaphragm valve with a sealing diaphragm which is subject to low stress in order to gain high life expectancy.

To solve this problem it is provided that, in conjunction with the features described above, the sealing section is at least partly a constituent of a loose diaphragm section of the sealing diaphragm which extends, without being fastened to the diaphragm carrier, from the mounting diaphragm section to the outer edge section of the sealing diaphragm fixed to the valve housing, so that it is able to lift from the base surface of the diaphragm carrier when the diaphragm carrier removes itself from the valve seat during its switchover movement.

In this way, to break the fluid connection of two fluid passages, a sealing section of the sealing diaphragm is also pressed with sealing, by the diaphragm carrier bearing the sealing diaphragm, against an assigned valve seat. By this means, even with high fluid pressure, undesired lifting of the sealing section from the valve seat is counteracted and high sealing quality is ensured. At the same time, the sealing diaphragm itself is subject to only minimal stretching when the sealing section is lifted from the assigned valve seat by the appropriate switchover movement of the diaphragm carrier. The reason for this is that at least a portion of the sealing section belongs to a diaphragm section of the sealing diaphragm which extends between the mounting diaphragm section and the outer edge section of the sealing diaphragm fixed to the valve housing, in a manner not fastened to the diaphragm carrier, and is therefore able to detach itself from the base surface of the diaphragm carrier when the diaphragm carrier moves away from the assigned valve seat during its switchover movement. This non-fixed diaphragm section is described as the loose diaphragm section. Whereas the sealing section therefore, for fluid-tight interaction with the valve seat, is supported physically by the diaphragm carrier, at least a portion of the sealing section has scope to lift itself from the base surface of the diaphragm carrier with which it was previously in contact, or to detach itself from this base, when the diaphragm carrier is moved, in the sense of moving away from the valve seat, for the purpose of opening a fluid connection. Here in particular a pattern of behaviour may occur which might be described as a folding back or folding away of the loose diaphragm section. At the same time, in particular a gap, expanding wedge-like towards the edge of the base, may open up between the loose diaphragm section and the diaphragm carrier. Since the sealing diaphragm is not compelled, in the sections which are able to lift from the diaphragm carrier, to accompany the switchover movement of the diaphragm carrier to the full extent, it is subject to relatively low tensile stress. This results in a high life expectancy for the diaphragm valve, combined with the opportunity to design the diaphragm valve with compact dimensions. The fact that a constituent part of the sealing diaphragm containing at least a portion of the sealing section is able to detach itself from the diaphragm carrier makes it possible to use a sealing diaphragm which, in addition to the diaphragm carrier, needs no special space for deformation in the valve housing.

The diaphragm valve may have only one valve member or several and in particular two valve members. In a design with several valve members, each valve member expediently includes a separate diaphragm carrier and a separate sealing diaphragm, wherein however the sealing diaphragm is a one-piece component of a uniform diaphragm carrier.

Advantageous developments of the invention are revealed in the dependent claims.

The diaphragm carrier may for example be so designed that the switchover movement is a pivoting movement. Regarded as especially expedient, however, is a design in which the switchover movement of the diaphragm carrier is a linear movement. Such a diaphragm carrier is in particular plunger-like and has an axial end face facing the sealing diaphragm and forming the base surface serving to support the sealing section.

Preferably the sealing diaphragm is fastened by its mounting diaphragm section in the area of the base surface of the diaphragm carrier in such a way that there is radial clearance between this mounting diaphragm section and the outline of the base surface of the diaphragm carrier. The section of the sealing diaphragm between the mounting diaphragm section and the outline of the base surface is a constituent part of the loose diaphragm section. The mounting diaphragm section is in particular located centrally in the area of the base. Especially expedient is a variant in which the mounting diaphragm section encloses the mounting diaphragm section all round in an area in front of the base. This leads in particular to an annular area of the loose diaphragm section, which is movable relative to the diaphragm carrier during the switchover movement of the diaphragm carrier, so that it is not compelled to follow the switchover movement to the diaphragm carrier to the full extent, in which it would be subject to a high tensile loading.

In a preferred embodiment, the valve seat of the diaphragm valve is annular and closed, so that it frames the passage opening of a fluid passage. To block this fluid passage, a similarly annular sealing section of the sealing diaphragm also fits up against the valve seat. At least one portion of this annular sealing section is in the form of a part of the loose diaphragm section, so that it can lift up from the diaphragm carrier when the latter is moved away from the valve seat to open up the fluid passage.

Preferably the sealing diaphragm is so designed that an annular sealing section cooperating with an annular valve seat is in its entirety a constituent part of the loose diaphragm section, so that it is able to lift as a whole from the base surface of the diaphragm carrier, when the diaphragm carrier moves away from the valve seat in the course of the switchover movement. In principle, however, a design is also possible in which the sealing section cooperating with the valve seat is partly a constituent part of the mounting diaphragm section and only partly a constituent part of the loose diaphragm section.

When the base surface of the diaphragm carrier is viewed in a plan view, the sealing section lies expediently completely within the outer contour of the base surface of the diaphragm carrier.

In a similarly advantageous embodiment of the diaphragm valve, the valve seat is web-like and extends in such a way between two opposing side wall sections of the valve chamber that it divides this valve chamber into two chamber sections lying this side and that side of the web-like valve seat. The sealing section, in this case strip-like, belongs at least partly to the loose diaphragm section. In particular a form of construction is provided in which the sealing section is formed partly by the mounting diaphragm section, so that it is able to lift only partially from the base surface of the diaphragm carrier. The sealing section expediently has two areas able to lift from the diaphragm carrier and flanking the mounting diaphragm section on opposite sides.

Preferably the sealing diaphragm, in the area of the mounting diaphragm section, is fastened solely in the interior of the diaphragm carrier. In particular in this connection it is advantageous if the sealing diaphragm is part of a one-piece diaphragm body, which has in the area of the mounting diaphragm section at least one and preferably exactly one mounting extension, extending from the base surface to engage in the diaphragm carrier. At the point where the mounting extension engages in the diaphragm carrier, the base surface has an opening, wherein the base surface is in particular annular and preferably circular-arc-shaped.

The fastening of the sealing diaphragm inside the sealing diaphragm is effected in particular solely on the basis of positive or friction locking. For example a diaphragm body may, in the course of its manufacture by injection moulding, be moulded on to the diaphragm carrier, wherein a mounting extension engaging in the diaphragm carrier is formed. It is however quite easily possible to fix the mounting diaphragm section alternatively or additionally by adhesive bonding to the diaphragm carrier, for example through an adhesive bond.

The sealing diaphragm is preferably so designed that it extends all round the diaphragm carrier along the outer contour of the base surface of the diaphragm carrier and has a diaphragm outer section bordering the base surface on the outside and merging into the outer edge section fixed with sealing to the valve housing. This diaphragm outer section is expediently covered at its top which faces away from the valve chamber by a support wall of the valve chamber, so that it can also withstand high fluid pressures prevailing in the valve chamber. The support wall expediently has an orifice through which the diaphragm carrier extends in a manner which allows the switchover movement, giving the advantage that the gap between the diaphragm carrier and the support wall can be kept very small.

The valve chamber and the sealing diaphragm closing the valve chamber have in particular a longitudinal shape with a narrow-sided rounded contour, or expediently have a round contour. In the valve chamber, the passage openings of the entering fluid passages are preferably arranged alongside one another wherein, in the case of an elongated valve chamber they are arranged consecutively at intervals, in particular in the axial direction of this valve chamber.

The diaphragm valve is expediently equipped with electrically actuable drive means, which serve for actuation of the valve member and which in particular facilitate the driving of the diaphragm carrier to perform its switchover movement as required, and also its holding in the respectively desired position. Such drive means preferably include at least one electromagnetic device and preferably also a return spring device which presets a desired basic position.

BRIEF DESCRIPTION OF THE DRAWING

The invention is described in detail below with the aid of the appended drawing, showing in.

DETAILED DESCRIPTION OF THE PREFERRED EMBODIMENTS

Figure 1:
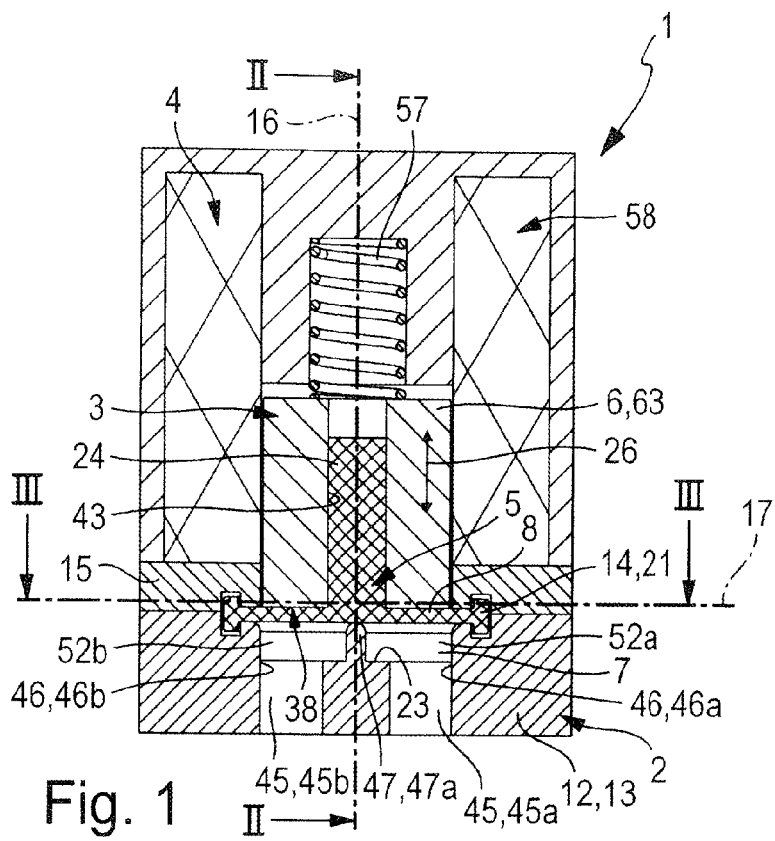
FIG. 1 a longitudinal section through a preferred embodiment of the diaphragm valve according to the invention, and having a web-like valve seat, along section line I-I of FIGS. 2 and 3, and showing a closed position, FIG. 2 the diaphragm valve of FIG. 1 in a longitudinal section rotated through 90° relative to FIG. 1, and along section line II-II of FIGS. 1 and 3, FIG. 3 a cross-section through the diaphragm valve according to section line III-III of FIG. 1, FIG. 4 the diaphragm valve of FIGS. 1 to 3 in an open position and in a longitudinal sectional view corresponding to FIG. 1 along section line IV-IV of FIG. 5, FIG. 5 the diaphragm valve adopting the open position in a longitudinal section according to section line V-V of FIG. 4, FIG. 6 the longitudinal section illustrated in FIG. 5, with an isometric perspective, FIG. 7 a further embodiment of the diaphragm valve according to the invention, with an annular valve seat, wherein a closed position is shown in a longitudinal section according to section line VII-VII of FIGS. 8 and 9, FIG. 8 the diaphragm valve of FIG. 7 in a longitudinal section rotated through 90°, according to section line VIII-VIII of FIGS. 7 and 9, FIG. 9 a cross-section through the diaphragm valve of FIGS. 7 and 8 according to section line IX-IX of FIG. 7, FIG. 10 the diaphragm valve of FIGS. 7 to 9 in an open position and in a longitudinal section corresponding to FIG. 7 according to section line X-X of FIG. 11, FIG. 11 the diaphragm valve of FIGS. 7 to 10 in a longitudinal section according to section line XI-XI, illustrating by dot-dash lines a preferred embodiment of electrically actuable drive means for the valve member, and FIG. 12 a further embodiment of the diaphragm valve according to the invention, with two annular valve seats, in a sectional view analogous to FIG. 7.
Figure 2:
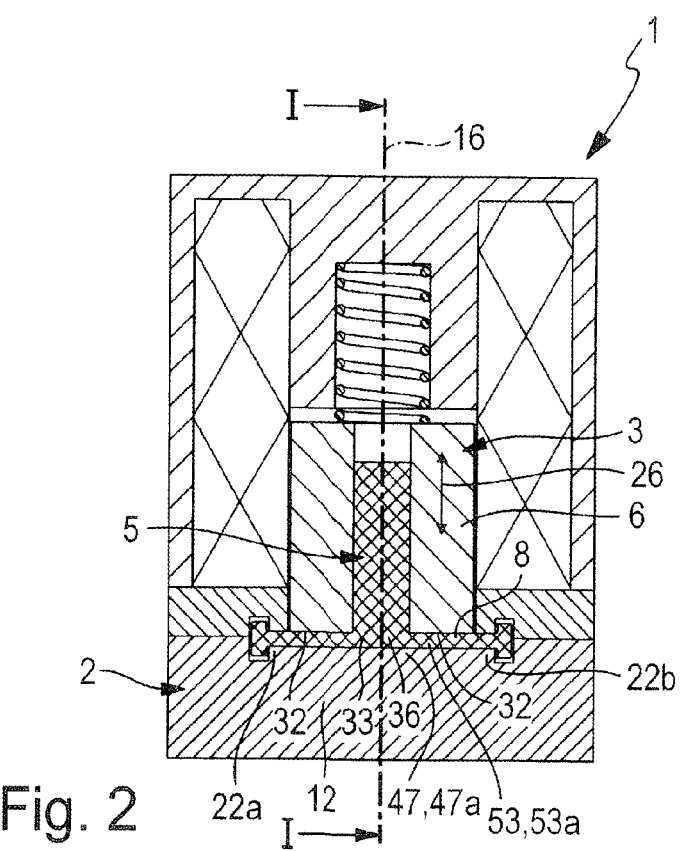
Figure 4:
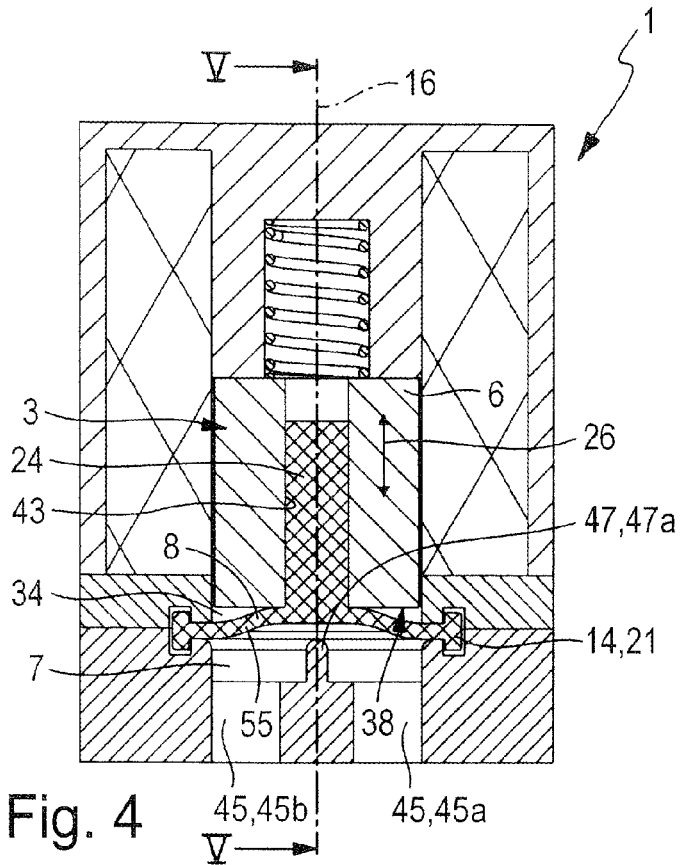
Figure 5:
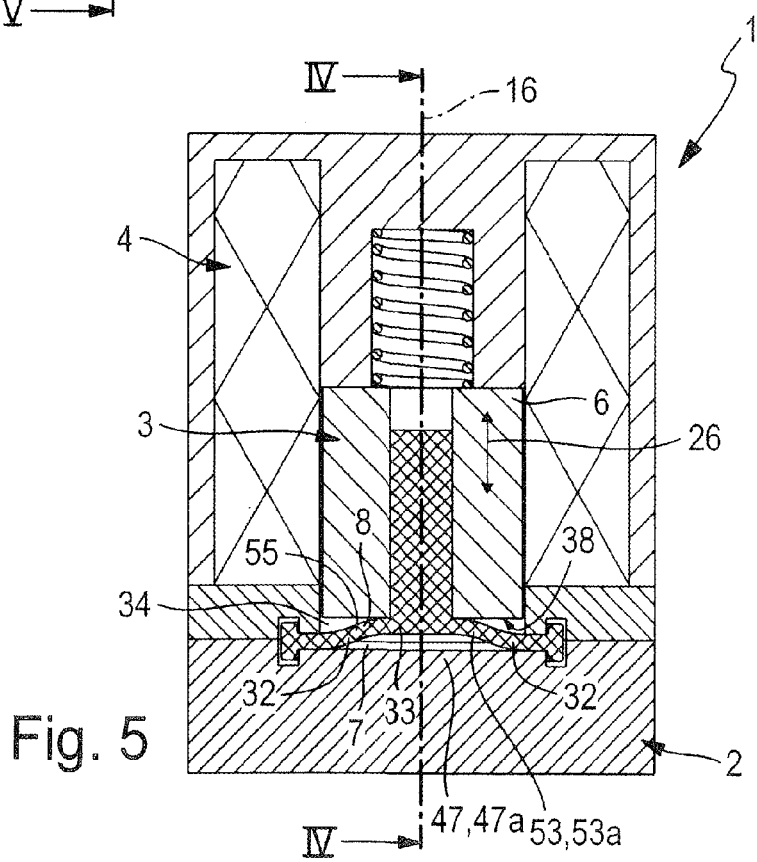
Figure 6:
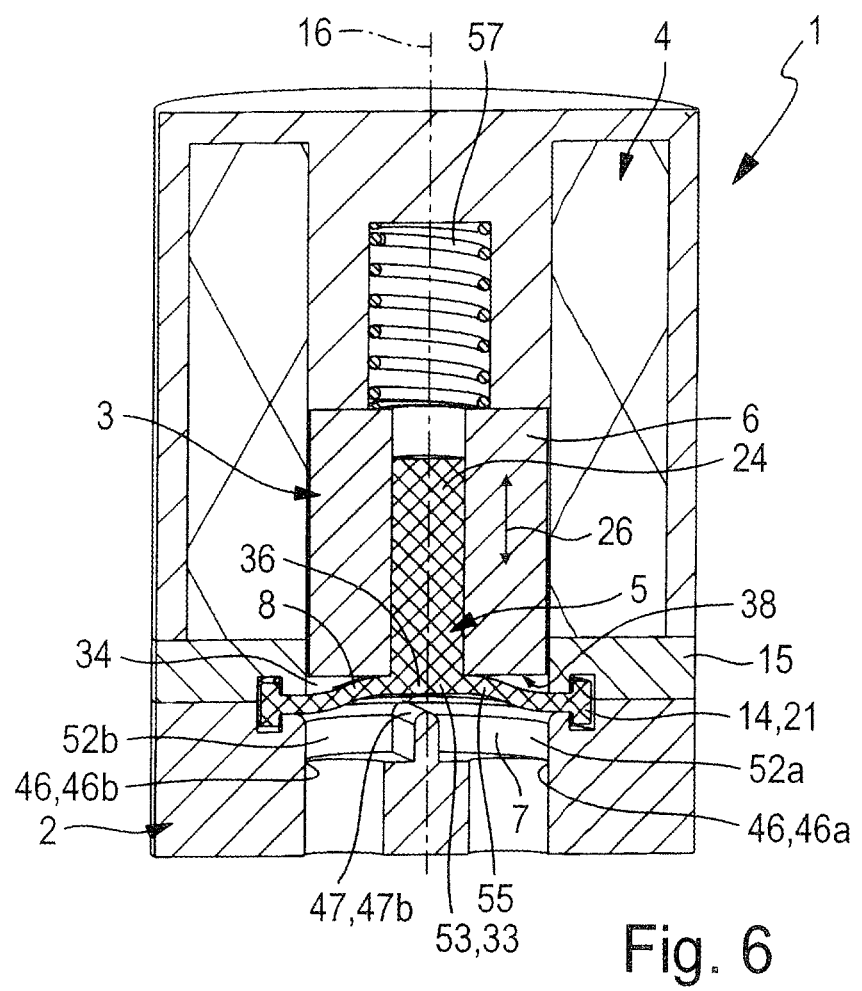

The diaphragm valve designated in its totality by reference number 1 has in all embodiments a valve housing 2 and a valve member 3 mounted in and movable relative to the valve housing 2. In addition, the diaphragm valve 1 is equipped with electrically actuable drive means 4, preferably accommodated in the interior of the valve housing 2 and through which the valve member 3 may be switched between two possible switching positions. FIGS. 1 and 2 together with 7 and 8 show in each case a first switching position, which involves a closed position. FIGS. 4 to 6 plus 10 and 11 show in each case a second switching position, involving by way of example an open position.

The valve member 3 is preferably designed as a composite element, comprised of a diaphragm body 5 and at least one diaphragm carrier 6 carrying the diaphragm body 5. These components are fastened together in a manner to be explained below. Whereas the diaphragm carrier 6 is made of a stiff material, for example of a rigid plastic material or of metal, the diaphragm body 5 is made of a flexible and preferably rubber-elastic material. Preferably the diaphragm body 5 is an elastomer body.

Inside the valve housing 2 is a hollow space forming a valve chamber 7. The valve chamber 7 is bounded on one side by the valve housing 2 and on the other side by a diaphragm-like part of the diaphragm body 5 designated as the sealing diaphragm 8.

The valve housing 2 defines a base surface 12 bounding the valve chamber 7 at the bottom. The base surface 12 is preferably part of a first housing section 13 of the valve housing 2.

The sealing diaphragm 8 extends in two dimensions, extending at an upper side beyond the base surface 12. With an outer edge section 14 defining the outer contour of the sealing diaphragm 8, the sealing diaphragm 8 is so fixed to the valve housing 2, with sealing, that together with the base surface 12 it bounds the sealed valve chamber 7 from the surrounding area.

The fluid-tight fixing of the outer edge section 14 is expediently realised by the firm clamping of this outer edge section 14 between the first housing section 13 and a second housing section 15 of the valve housing 2. At the outer edge section 14, the sealing diaphragm 8 has expediently in this connection a mounting bead 21 determining the outer contour of the sealing diaphragm 8. This engages in annular slots formed on the facing surfaces of the first and second housing sections 13, 15.

The direction in which the sealing diaphragm 8 lies opposite the base surface 12 is described below as the vertical direction 16. At right-angles to the vertical direction 16, the valve chamber 7 has a main axis 17 and a lateral axis 18 at right-angles to the former. In the embodiment of FIGS. 7 to 11, the valve chamber 7 has preferably an elongated shape, with the main axis 17 forming the longitudinal axis. In the area of the narrow sides, the valve chamber 7 is here in particular rounded. FIGS. 1 to 6 show that the valve chamber may also have a different outline. In this embodiment the valve chamber 7, viewed in the vertical direction 16, has a circular outline. The specified outlines apply equally to the respectively assigned sealing diaphragm 8, wherein the outline of the sealing diaphragm 8 is determined in particular by the course of the outer edge section 14.

To the side, each valve chamber 7 is bounded by a side wall 22 determining the outline referred to above, which extends upwards above a bottom 23 of the valve chamber 7 facing the sealing diaphragm 8 and formed on the base surface 12. The diaphragm body 5 has a mounting extension 24, preferably formed in one piece with the sealing diaphragm 8, and extending away in the vertical direction 16 towards the diaphragm carrier 6. The diaphragm body 5 is fastened to the diaphragm carrier 6 by means of this mounting extension 24. In the embodiment of FIGS. 1 to 6, the mounting extension 24 is provided in the central section of the sealing diaphragm 8. Varying from this, in the embodiment of FIGS. 7 to 11, it is mounted off-centre on the sealing diaphragm 8 in the axial direction of the main axis 17.

The diaphragm carrier 6 is mounted on the side of the sealing diaphragm 8 opposite the base surface 12 in the vertical direction 16. The sealing diaphragm 8 therefore lies between the valve chamber 7 and the diaphragm carrier 6 in the vertical direction 16.

In all embodiments, the diaphragm carrier 6 is mounted with linear movement capability relative to the valve housing 2. The movement which may be executed by the diaphragm carrier 6 is subsequently described as the switchover movement 26, because it acts directly on the switching position of the valve member 3. The switchover movement 26 is preferably a linear movement, running in the case of the embodiments in the vertical direction 16. Accordingly the diaphragm carrier 6 may be moved to and fro in the vertical direction 16 during execution of a linear switchover movement 26. In this connection, depending on the direction of movement, the diaphragm carrier 6 moves towards or away from the base surface 12.

A section of the sealing diaphragm 8 accompanies the switchover movement 26 of the diaphragm carrier 6 without restriction. This involves a diaphragm section of the sealing diaphragm 8 described hereafter as the mounting diaphragm section 36, via which the sealing diaphragm 8 is fastened to the diaphragm carrier 6.

Common to all the embodiments is that the sealing diaphragm 8, in the area of the mounting diaphragm section 36, is fastened solely inside the diaphragm carrier 6. For this purpose the mounting extension 24 is provided directly on the mounting diaphragm section 36 and engages, from the side of a base surface 38 of the diaphragm carrier 6 facing the sealing diaphragm 8, in a mounting recess 43 of the diaphragm carrier 6 which is open towards the base surface 38. The base surface 38 is preferably flat and extends in particular at right-angles to the vertical direction 16 and/or the direction of the switchover movement 26.

The mounting extension 24 is so fixed in the mounting recess 43 that it directly accompanies the linear switchover movement 26 of the diaphragm carrier 6. This also applies, consequently, for the mounting diaphragm section 36 mounted directly on the mounting extension 24 and lying outside the mounting recess 43. In both embodiments the mounting diaphragm section 36 is assigned to the central section of the base surface 38.

The sealing diaphragm 8 is expediently held to the diaphragm carrier 6 solely in the area of the mounting diaphragm section 36. Expressed more precisely, the final connection results from the interaction between the inner periphery of the mounting recess 43 and the mounting extension 24 dipping into the mounting recess 43. Between these two components there is in the embodiments an adhesive-bonded connection, obtained by means of an adhesive which is not visible in the drawing. Additionally or alternatively, however, a friction-locked connection is also possible. Moreover the mounting recess 43 may also be so contoured that it additionally or alternatively makes a positive-locking connection in the vertical direction 16 with the mounting extension 24. The latter may be obtained for example by providing the mounting recess 43 with at least one constriction which engages or presses into a constricted or wasted circumferential section of the mounting extension 24 in a direction radial to the vertical direction 16.

Several fluid passages 45 which pass through the valve housing 2 open out into the valve chamber 7. In the embodiments of FIGS. 1 to 11 there are altogether two fluid passages, since the diaphragm valve 1 is used here as a shut-off valve with a 2/2 valve function. If a diaphragm valve 1 with greater valve functionality is to be realised, for example with a 3/2 valve function, then at least three and preferably exactly three fluid passages lead into the valve chamber 7. This applies to the embodiment of FIG. 12.

In the embodiments, two fluid passages 45 may also be described below, for better distinction, as the first and second fluid passage 45a, 45b. Both fluid passages 45a, 45b expediently pass through the base surface 12 and open out at the bottom 23 into the valve chamber 7, each with a passage opening 46. For better distinction, here too the passage openings 46 may be designated as first and second passage openings 46a, 46b.

In the embodiments of FIGS. 1 to 11, depending on the switching position of the valve member 3, the two fluid passages 45a, 45b may either be separated by the diaphragm valve 1 with fluid-tightness from one another, or else have a fluidic connection with one another through the valve chamber 7. The latter occurs in the open position of the valve member 3 referred to earlier. To break the fluid connection, the valve member 3 is shifted into the closed position.

In order to exercise this valve functionality, the valve member 3 cooperates with a valve seat 47 mounted immovably relative to the valve housing 2. The illustrated diaphragm valves 1 differ from one another in the structure of their valve seat 47. The valve seat 47 according to the embodiment of FIGS. 1 to 6 is web-like in form and may therefore also be described below as the web-like valve seat 47a. Each valve seat 47 of the embodiment of FIGS. 7 to 11 and FIG. 12 is annular and closed and may therefore be described below as the annular valve seat 47b.

The web-like valve seat 47a extends in the valve chamber 7 transversely to the vertical direction 16 between opposite side wall sections 22a, 22b, in particular diametrical, of the side wall 22. In this way the valve chamber 7 is divided by the valve seat 47a into two chamber sections 52a, 52b, in which is to be found one of the two passage openings 46a, 46b. Preferably the valve seat 47a has a linear longitudinal extent, which may be well seen in FIG. 5.

In the embodiment of FIGS. 7 to 11, only the first passage opening 46a is framed by an annular valve seat 47b, which is preferably raised in the manner of a collar at the bottom 23, extending upwards from that point in the vertical direction 16 towards the sealing diaphragm 8.

In all embodiments the sealing diaphragm 8 extends over the valve seat 47. At the same time it has, in a section opposite the valve seat 47 in the vertical direction 16 a sealing section 53, which is provided before the base surface 38 in the vertical direction 16 and which, in execution of the switchover movement 26 and depending on the direction of movement, may be pressed by the diaphragm carrier 6 on to the assigned valve seat 47 with a fluid-tight seal, or else lifted from the valve seat 47. In the closed position of the valve member 3, the sealing section 53 fits up with sealing against the assigned valve seat 47, while in the open position of the valve member 3 it is lifted from this valve seat 47.

The sealing section 53 is that portion of the sealing diaphragm 8 which may be brought into contact with the assigned valve seat 47. Its shape therefore corresponds to that of the valve seat 47. Accordingly, the sealing section 53 of FIGS. 1 to 6 has a strip-like sealing section 53a, and in the embodiments of FIGS. 7 to 12 it has an annular sealing section 53b. Each sealing section 53 lies opposite the valve seat 47 in the vertical direction vertical direction 16.

In the embodiment of FIGS. 7 to 11, the annular valve seat 47b lies expediently wholly within the outer contour 54 of the base surface 38 of the diaphragm carrier 6 facing the sealing diaphragm 8. In both embodiments this base surface is formed by an axially oriented end face of the diaphragm carrier 6, which is preferably plunger-like in form. Even with a web-like valve seat 47a it is according to FIGS. 1 to 6 advantageous if the web-like valve seat 47a is covered at least approximately over its whole length by the base surface 38 of the diaphragm carrier 6.

The outer edge section 14 fixed to the valve housing 2 and the mounting diaphragm section 36 of the sealing diaphragm 8 are arranged transversely to the vertical direction 16, with clearance from one another. Preferably the outer edge section 14 encloses the mounting diaphragm section 36 all round in the manner of an enclosed frame.

The sealing diaphragm 8 also has a special diaphragm section, described below as the loose diaphragm section 55. This loose diaphragm section 55 extends between the mounting diaphragm section 36 and the outer edge section 14; it is not fastened to the diaphragm carrier 6—except via the mounting diaphragm section 36—and is loosely mounted in front of the base surface 38. The sole connection between the sealing diaphragm 8 and the diaphragm carrier 6 effecting any fixing is therefore provided by the mounting diaphragm section 36. While this mounting diaphragm section 36 directly accompanies the switchover movement of the diaphragm carrier 6, the loose diaphragm section 55 is able to lift up from the base surface 38 when the diaphragm carrier 6 moves from the closed position into the open position, at the same time moving away from the valve seat 47. The sealing section 53 belongs at least in part to the loose diaphragm section 55. Therefore the sealing section 53 may also be lifted at least partially from the base surface 38 in the direction of the switchover movement 26. For the part of the sealing section 53 belonging to the loose diaphragm section 55, also described below as the unfixed part 32 of the sealing section 53, it therefore applies that, in the closed position of the valve member 3 it is supported by the base surface 38 of the diaphragm carrier 6 and is pressed against the valve seat 47, while in the open position of the valve member 3 it is lifted not only from the valve seat 47 but also in an advantageous manner from the base surface 38 of the diaphragm carrier 6.

Figure 3:
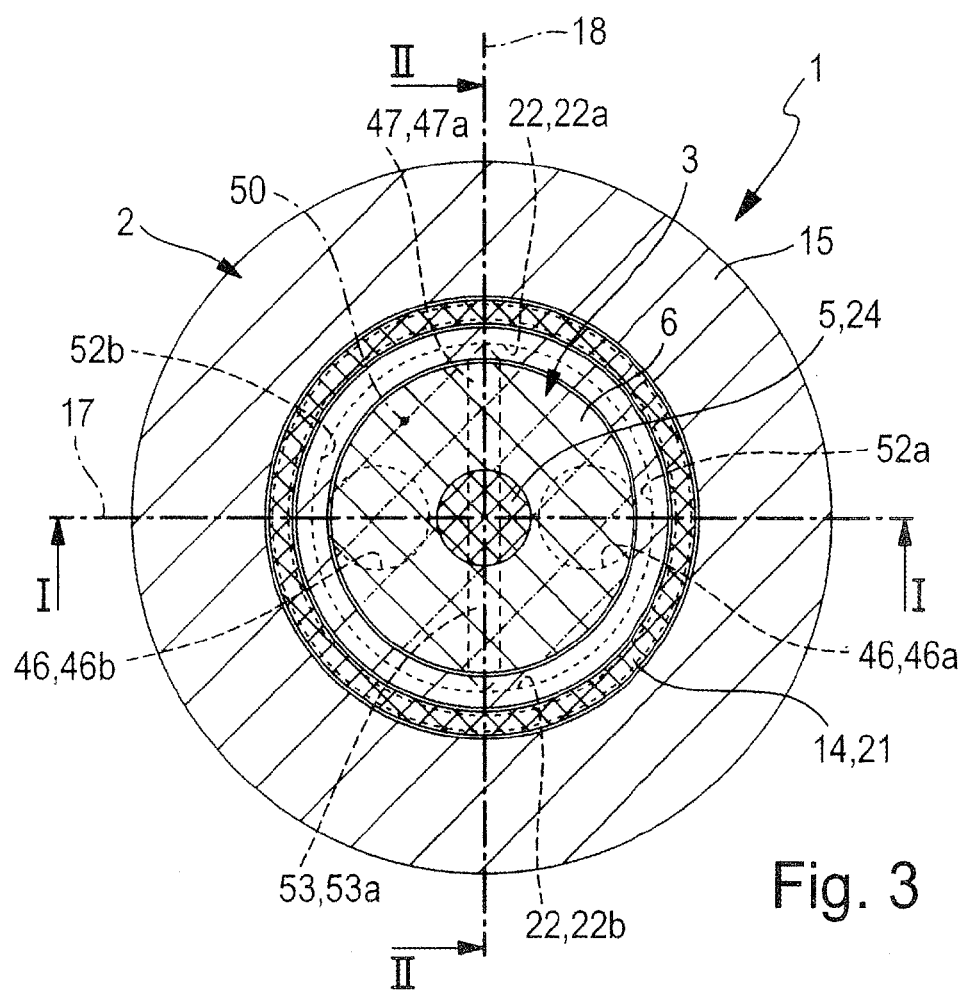
Figure 9:
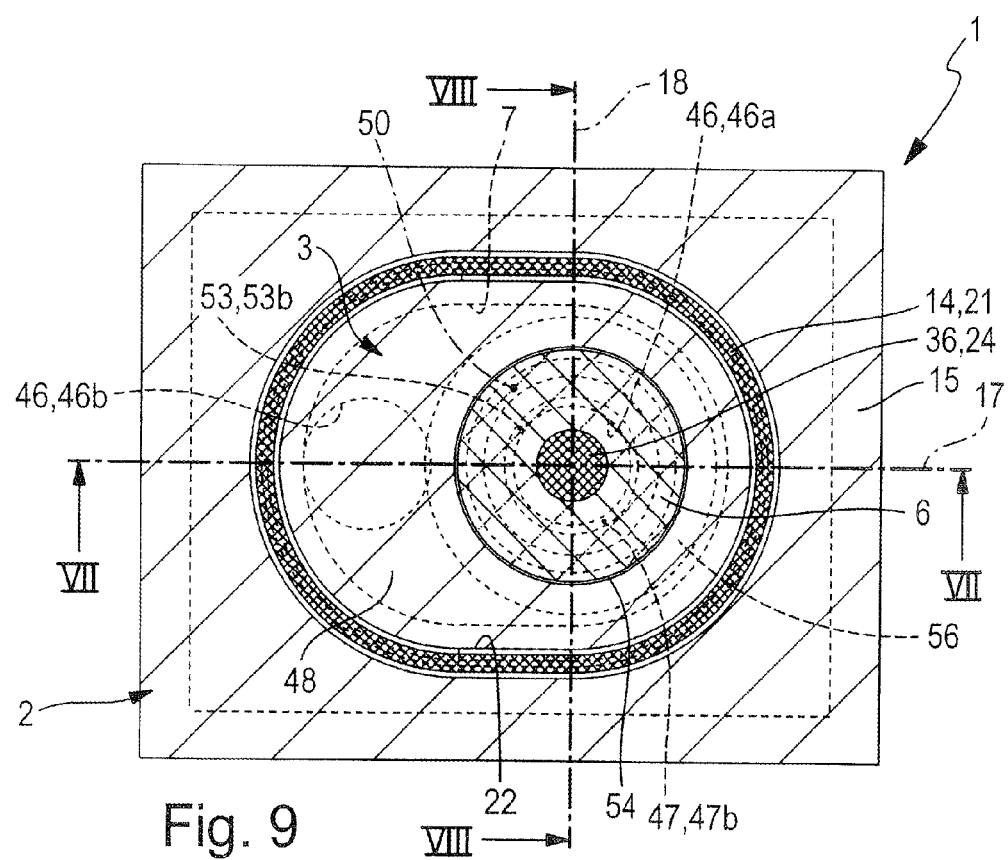
Figure 10:
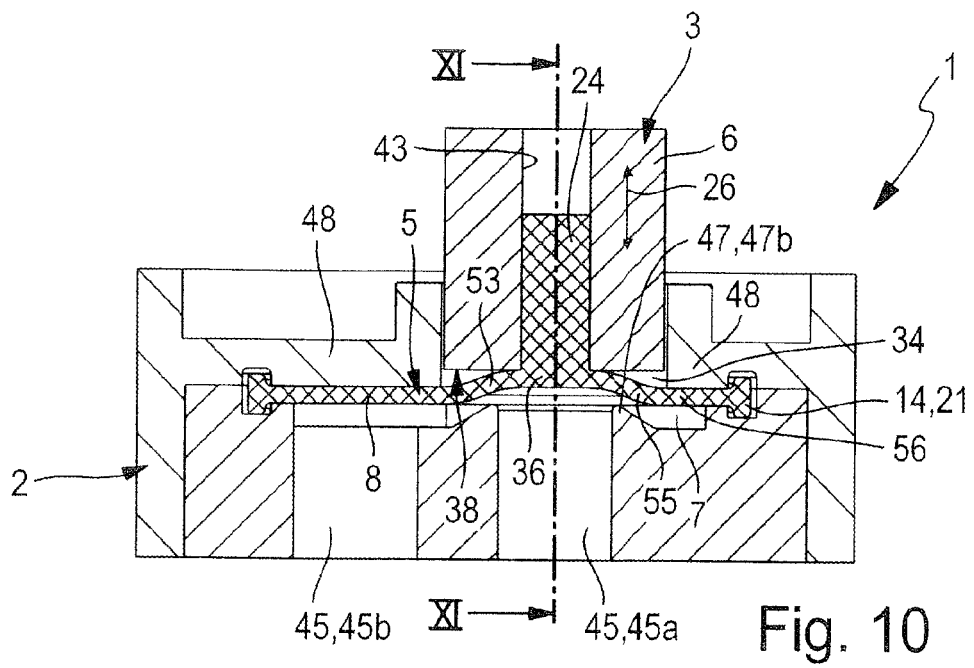
Figure 11:
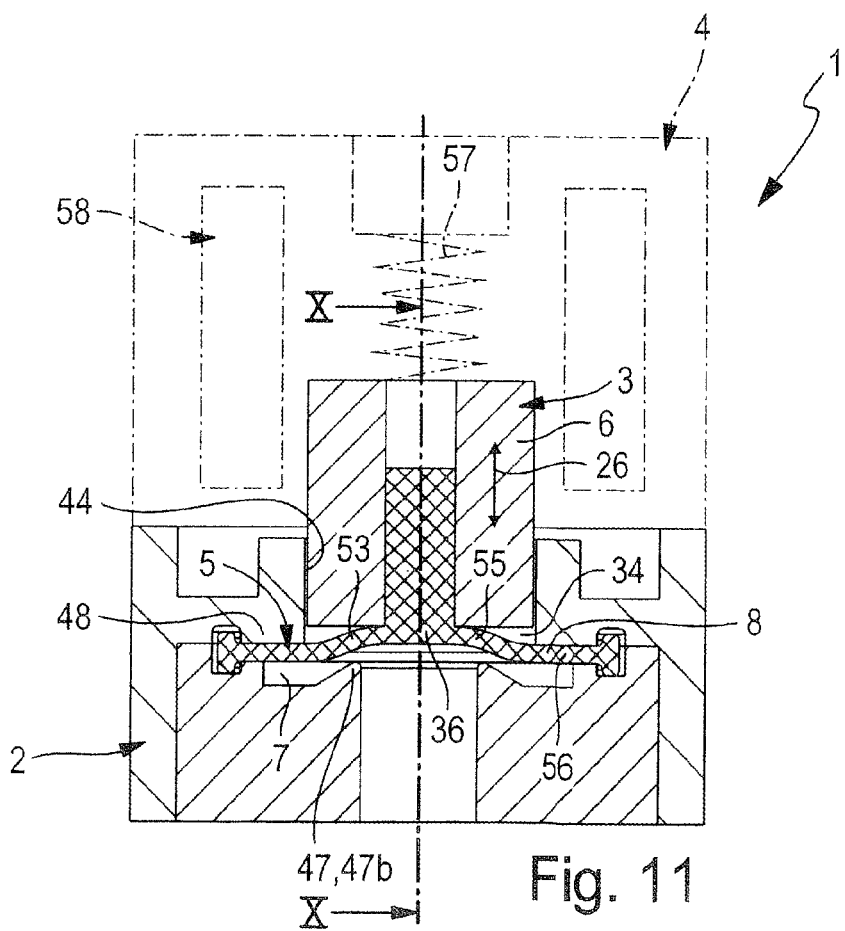

In FIGS. 3 and 9, the portion of the loose diaphragm section 55 lying within the contour 54 of the base surface 38 is made recognizable by dot-dash shading 50. It is mounted in front of the base surface 38 in the vertical direction 16 and frames the mounting diaphragm section 36, preferably coaxially. Here it may also be easily recognized that the mounting diaphragm section 36 is arranged expediently all-round with radial clearance from the outer contour 54 of the base surface 38.

When the loose diaphragm section 55 lifts from the diaphragm carrier 6, this expediently results in a roughly wedge-shaped widening gap 34 between these two components, from the mounting extension 24 towards the contour 54, and very clearly visible in FIGS. 4 to 6, 10 and 11.

Due to the fact that the sealing diaphragm 8 is not fastened to the diaphragm carrier 6, except at the mounting diaphragm section 36, the sections of the sealing diaphragm 8 adjoining the mounting diaphragm section 36, in particular the loose diaphragm section 55, are not compelled to accompany the switchover movement 26 of the diaphragm carrier 6 to the full extent, which reduces the tensile loading of the sealing diaphragm 8 and has a positive effect on life expectancy.

The diaphragm valve 1 may be so designed that only a portion of the sealing section 53 forms part of the loose diaphragm section 55. By way of example, this applies to the embodiment of FIGS. 1 to 6. The sealing section 53a, here strip-like in form, extends in part over the mounting diaphragm section 36 and in part over the loose diaphragm section 55. Accordingly the sealing section 53 has a fixed part 33 formed by the mounting diaphragm section 36 and at least one unfixed part 32 formed by the loose diaphragm section 55. In the embodiment, in which the strip-like sealing section 53a extends diametrically beyond the base surface 38, consequently only the two unfixed parts 32 of the sealing section 53 are able to fold back from the diaphragm carrier 6 during the switchover movement 26.

The diaphragm valve 1 may also be so designed that the sealing section 53 in its totality is a part of the loose diaphragm section 55. This is the case in the embodiments of FIGS. 7 to 12. The sealing section 53, 53b, here annular in form, extends with lateral clearance and in particular with radial clearance from the mounting diaphragm section 36 around this mounting diaphragm section 36, so that it is able to lift completely from the base surface 38 of the diaphragm carrier 6 when the latter moves away from the annular valve seat 47b in the course of its switchover movement 26.

The loose diaphragm section 55 expediently includes a diaphragm outer section 56 which, viewed in the vertical direction 16, frames the outer contour 54 of the base surface 38 all round and merges into the outer edge section 14. The embodiments of FIGS. 7 to 12 show such a design. Since this diaphragm outer section 56 is not covered by the diaphragm carrier 6, it receives no support from the diaphragm carrier 6 against the fluid pressure prevailing in the valve chamber 7. So that equally the diaphragm outer section 56 is subject to no overloading even at high fluid pressures, it is expediently covered on its upper side facing away from the valve chamber 7 by a support wall 48 of the valve housing 2 which provides a supporting effect relative to the diaphragm outer section 56. The support wall 48 is preferably a part of the second housing section 15. It extends from the outer side facing the outer edge section 14 over the sealing diaphragm 8 and preferably as far as the immediate vicinity of the diaphragm carrier 6, which expediently passes through a wall opening 44 in the support wall 48 with linear sliding capability.

The axial support of the diaphragm outer section 56 is possible without impairing the functioning of the valve member 3, since the sealing diaphragm 8 has in the area of the loose diaphragm section 55 the necessary freedom of movement to ensure the lifting movement of the diaphragm carrier 6 including the assigned sealing section 53.

The diaphragm valve 1 may also be so designed that the part of the sealing diaphragm 8 reaching as far as the outer contour 54 immediately adjoins the outer edge section 14 fixed to the valve housing 2. This applies to the embodiment of FIGS. 1 to 6. Here the diaphragm carrier 6 covers with its base surface 38 the entire cross-sectional surface of the valve chamber 7.

On account of the scope for the loose diaphragm section 55 to lift from the diaphragm carrier 6 or to fold back or away from the diaphragm carrier 6, there is the advantageous option of producing the sealing diaphragm 8 with a flat structure with no outward bulges. The best example of this is the design of FIGS. 1 to 6, in which the sealing diaphragm 8, apart from the mounting bead 21, has a flat shape with substantially constant wall thickness. Equally the sealing diaphragm 8, in particular in the area of the outer contour 54 of the diaphragm carrier 6, may have a deformation section 60, preferably annular viewed in the vertical direction 16, and having at least one outwards bulge.

The electrical drive means 4 provided in the embodiments of FIGS. 1 to 11 expediently include in each case a spring device 57 which rests between the valve housing 2 and the diaphragm carrier 6 and which constantly presses on the diaphragm carrier 6 so that the latter is biased into the closed position referred to earlier. This closed position therefore defines the basic position of the diaphragm valve 1 for both embodiments.

To switch over into the open position, the drive means 4 contain in particular an electromagnetic device 58, shown schematically, which contains an electromagnetically drivable drive member 63, formed by an electromagnetically drivable armature of the electromagnetic device 58. This armature is integral with the diaphragm carrier 6 in the embodiments of FIGS. 1 to 11. On activation of the electromagnetic device 58 a magnetic actuating force is generated, which moves the diaphragm carrier 6 into the open position, overcoming the restoring force of the spring device 57. The spring device 57 is expediently part of the electromagnetic device 58.

Naturally the drive means 4 may also be of another type than that described here.

Figure 12:
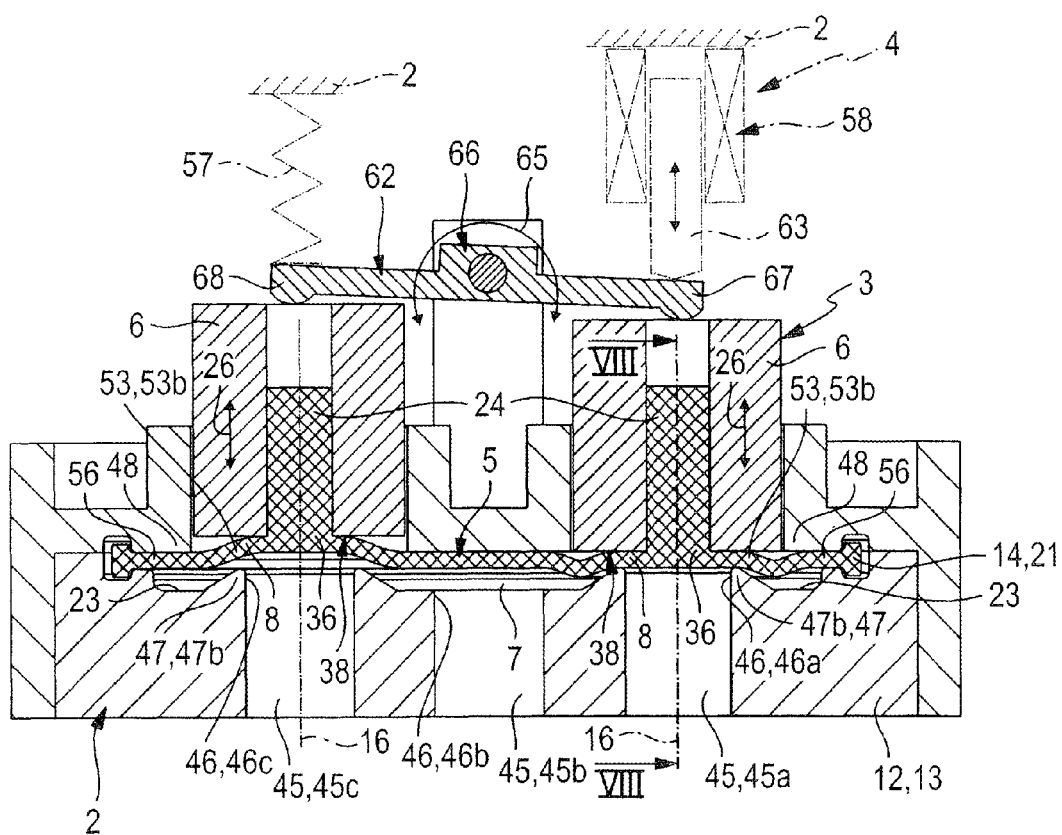

In the embodiment of the diaphragm valve 1 depicted in FIG. 12, a single diaphragm body 5 is divided functionally into two sealing diaphragms 8, each connected to a separate diaphragm carrier 6, so that each may cooperate with a separate valve seat 47, 47b.

Both diaphragm carriers 6 here are expediently plunger-like in form and guided to move linearly parallel to one another. They are so connected in drive terms that the one diaphragm carrier 6 approaches the assigned valve seat 47, 47b when the other diaphragm carrier 6 is lifted from the assigned valve seat 47, 47b. The driving connection may be realised in particular by means of a rocker-like, pivotable operating lever 62, which may be driven by the drive means 4 to a to-and-fro pivoting movement 65, and which has two driving arms 67, 68, each cooperating with one of the two diaphragm carriers 6. Thus, in this embodiment, the pivoting movement 65 of the operating lever 62 is converted into the linear switchover movement of the two diaphragm carriers 6.

The embodiment of FIG. 12 differs from that of FIGS. 7 to 11 in particular through an additional third fluid passage 45c, which leads into a third passage opening 46c in the valve chamber 7 and which, like the first passage opening 46a, is assigned a valve seat 47, once again involving an annular valve seat 47b. Over each of these two valve seats 47b extends one of the two sealing diaphragms 8 integrated in the one-piece diaphragm body 5. In addition, lying opposite each of these annular valve seats 47b is one of the two diaphragm carriers 6, to which in each case one of the two sealing diaphragms 8, i.e. in each case one diaphragm section of the diaphragm body 5, is fastened in a similar manner in the area of a mounting diaphragm section 36, as in the embodiment of FIGS. 7 to 11. One may say that in the embodiment of FIG. 12, the functional unit described with the aid of FIGS. 7 to 11, comprising a diaphragm carrier 6, a sealing diaphragm 8 and an annular valve seat 47b, is present in duplicate while, by means of the operating lever 62, actuation is effected in the manner described above, and wherein the two sealing diaphragms are combined in one piece to form the diaphragm body 5.

Therefore, in the embodiment of FIG. 12, the second fluid passage 45b may be connected alternately to either the first fluid passage 45a or the third fluid passage 45c and at the same time isolated from the other respective fluid passage 45c or 45a.

The drive means 4 in the embodiment of FIG. 12 are also preferably electrically actuable, and expediently include an electromagnetic device 58, indicated schematically, and an electromagnetically drivable drive member 63. The drive member 63 exerts on the operating lever 62 a driving force which generates the pivoting movement 65, wherein it expediently has to overcome the resetting force of a spring device 57.

Visible at 66 are pivot bearing means, through which the operating lever 62 is mounted pivotably relative to the valve housing 2 to make possible the pivoting movement 65.

Otherwise, components in FIG. 12 which correspond to those of the embodiment of FIGS. 7 to 11 are provided with the same reference numbers as in FIGS. 7 to 11. Also the statements made on FIGS. 7 to 11 apply accordingly to this extent for the embodiment of FIG. 12.

As a variation from the above embodiment, one or two diaphragm carriers 6 may also be fixed components of an altogether rocker-like, pivotable actuating element.

In the embodiments the diaphragm carrier 6 is made in one piece. Varying from this, however, a multi-part and in particular two-part construction is also possible. Consequently the sealing diaphragm 8 may for example be so fitted to a multi-part diaphragm carrier that it is pushed into the diaphragm carrier and then fixed in place by a sleeve, which simultaneously forms a bearing means for an axle shaft serving for pivotable bearing of the diaphragm carrier. The sealing diaphragm 8 or the diaphragm body 5 may also be fixed between two parts o the diaphragm carrier 6 by clamping.

What is claimed is:

1. A diaphragm valve comprising:
   a valve housing defining a valve chamber, a valve seat disposed within said valve chamber and two fluid passages in communication with said valve chamber;
   at least one valve member movable relative to said housing, wherein the valve member comprises a diaphragm carrier having a base surface facing the valve chamber, said diaphragm carrier being movable relative to the valve housing through the execution of a switchover movement; and
   a flexible sealing diaphragm facing the valve seat which, together with the valve housing, bounds the valve chamber,
   wherein the sealing diaphragm comprises:
      an outer edge section fixed to the valve housing thereby forming a seal between the valve housing and the sealing diaphragm;
      a mounting diaphragm section fastened to the base surface of the diaphragm carrier at a distance from said outer edge section, said mounting diaphragm section being movable together with said diaphragm carrier during the switchover movement;
      a sealing section at least partly supported by the base surface of the diaphragm carrier facing the valve chamber, said sealing section being sealable against said valve seat in order to separate said two fluid passages opening into the valve chamber; and
      a loose diaphragm section which extends, without being fastened to the diaphragm carrier, from the mounting diaphragm section to the outer edge section fixed to the valve housing, said loose diaphragm section being able to lift from the base surface of the diaphragm carrier when the diaphragm carrier moves away from the valve seat during its switchover movement, wherein the valve seat of the valve housing is annular and closed, so that it frames a passage opening of one of said two fluid passages, and wherein the sealing section of the sealing diaphragm is also annular, and wherein the loose diaphragm section comprises the entire annular sealing section, whereby both the loose diaphragm section and the annular sealing section lift up completely from the base surface of the diaphragm carrier when the diaphragm carrier is moved away from the valve seat during its switchover movement.

2. A diaphragm valve according to claim 1, wherein the switchover movement of the diaphragm carrier is a linear movement.

3. A diaphragm valve according to claim 2, wherein the diaphragm carrier comprises a tubular body having an end face forming the base surface, the end face bounded by an outer contour.

4. A diaphragm valve according to claim 3, wherein the mounting diaphragm section is radially spaced from the outer contour of the end face whereby the mounting diaphragm section is located in a central area of the base surface.

5. A diaphragm valve according to claim 1, wherein the loose diaphragm section frames the mounting diaphragm section.

6. A diaphragm valve according to claim 1, wherein the loose diaphragm section of the sealing diaphragm extends outwards around the base surface of the diaphragm carrier beyond the outer contour of the base surface and has a diaphragm outer section bordering the base surface on the outside and merging into the outer edge section fixed to the valve housing.

7. A diaphragm valve according to claim 6, wherein the diaphragm outer section of the sealing diaphragm is covered and is supported on its upper side which faces away from the valve chamber by a support wall of the valve housing, the support wall extending as far as the diaphragm carrier.

8. A diaphragm valve according to claim 1, wherein the valve chamber and the sealing diaphragm each have a round contour or an oblong contour which is rounded on the narrow sides.

9. A diaphragm valve according to claim 1, wherein the valve contains electrically actuatable drive means for actuation of the valve member.

10. A diaphragm valve according to claim 1, wherein the mounting diaphragm section of the sealing diaphragm is fastened to the base surface of the diaphragm carrier solely in the interior of the diaphragm carrier.

11. A diaphragm valve according to claim 1, wherein the sealing diaphragm is part of a one-piece diaphragm body, which has in the area of the mounting diaphragm section at least one mounting extension extending from the base surface to engage into the diaphragm carrier.

12. A diaphragm valve comprising:
a valve housing defining a valve chamber, a first valve seat disposed within said valve chamber, a second valve seat disposed within said valve chamber and three fluid passages in communication with said valve chamber;
two valve members movable relative to said housing, the two valve members comprising a first diaphragm carrier and a second diaphragm carrier, each diaphragm carrier having a base surface facing the valve chamber and being movable relative to the valve housing through the execution of a switchover movement; and
a flexible sealing diaphragm facing the first and second valve seats which, together with the valve housing, bounds the valve chamber, wherein the sealing diaphragm comprises:
an outer edge section fixed to the valve housing thereby forming a seal between the valve housing and the sealing diaphragm;
a first mounting diaphragm section fastened to the base surface of the first diaphragm carrier at a distance from said outer edge section, said first mounting diaphragm section being movable together with said first diaphragm carrier during the switchover movement;
a second mounting diaphragm section fastened to the base surface of the second diaphragm carrier at a distance from said outer edge section, said second mounting diaphragm section being movable together with said second diaphragm carrier during the switchover movement;
a first sealing section at least partly supported by the base surface of the first diaphragm carrier facing the valve chamber, said first sealing section being sealable against said first valve seat in order to separate a first of said three fluid passages from the other two of said three fluid passages opening into the valve chamber;
a second sealing section at least partly supported by the base surface of the second diaphragm carrier facing the valve chamber, said second sealing section being sealable against said second valve seat in order to separate a second of said three fluid passages from the other two of said three fluid passages opening into the valve chamber;
a first loose diaphragm section extending from the first mounting diaphragm section to the outer edge section without being fastened to the first diaphragm carrier, said first loose diaphragm section being able to lift from the base surface of the first diaphragm carrier when the first diaphragm carrier moves away from the valve seat during its switchover movement; and
a second loose diaphragm section extending from the second mounting diaphragm section to the outer edge section without being fastened to the second diaphragm carrier, said second loose diaphragm section being able to lift from the base surface of the second diaphragm carrier when the second diaphragm carrier moves away from the valve seat during its switchover movement, wherein each of the two diaphragm carriers may be moved linearly and parallel to one another in executing the linear switchover movement, and wherein the two diaphragm carriers are also coupled to one another for driving purposes by pivotable operating lever in such a way that the first diaphragm carrier approaches the first valve seat when the second diaphragm carrier is lifted from the second valve seat, wherein the operating lever is driven by electrically actuable drive means to perform a to-and-fro pivoting movement, the operating lever having two driving arms, each driving arm cooperating with one of the two diaphragm carriers, so that the pivoting movement of the operating lever is converted into the linear switchover movement of the two diaphragm carriers.

13. A diaphragm valve according to claim 12, wherein the valve seat comprises a web extending between two side wall sections of the valve chamber, thereby dividing the valve chamber into two chamber sections, and wherein the assigned sealing section has the shape of a strip matching a shape of the web.

14. A diaphragm valve according to claim 13, wherein the sealing section is formed partly by the mounting diaphragm section, so that the sealing section is able to lift only partly from the base surface of the diaphragm carrier when the diaphragm carrier moves away from the valve seat during its switchover movement, wherein the mounting diaphragm section is provided between two parts of the sealing section which are able to lift from the diaphragm carrier.

15. A diaphragm valve according to claim 12, wherein each of the two valve seats is annular.

16. A diaphragm valve comprising:
   a valve housing defining a valve chamber, a valve seat disposed within said valve chamber and two fluid passages in communication with said valve chamber;
   at least one valve member movable relative to said housing, wherein the valve member comprises a diaphragm carrier having a base surface facing the valve chamber, said diaphragm carrier being movable relative to the valve housing through the execution of a switchover movement; and
   a flexible sealing diaphragm facing the valve seat which, together with the valve housing, bounds the valve chamber,
   wherein the sealing diaphragm comprises:
      an outer edge section fixed to the valve housing thereby forming a seal between the valve housing and the sealing diaphragm;
      a mounting diaphragm section fastened to the base surface of the diaphragm carrier at a distance from said outer edge section, said mounting diaphragm section being movable together with said diaphragm carrier during the switchover movement;
      a sealing section at least partly supported by the base surface of the diaphragm carrier facing the valve chamber, said sealing section being sealable against said valve seat in order to separate said two fluid passages opening into the valve chamber; and
      a loose diaphragm section which extends, without being fastened to the diaphragm carrier, from the mounting diaphragm section to the outer edge section fixed to the valve housing, said loose diaphragm section being able to lift from the base surface of the diaphragm carrier when the diaphragm carrier moves away from the valve seat during its switchover movement,
   wherein the valve seat is annular and closed in a manner framing the passage opening of a fluid passage, wherein the sealing section of the sealing diaphragm is also annular and an integral part of the loose diaphragm section, so that the sealing section is able to lift completely from the base surface of the diaphragm carrier when the diaphragm carrier moves away from the valve seat in the course of its switchover movement, wherein the sealing diaphragm further comprises at least one mounting extension extending from the mounting diaphragm section and engaging into the diaphragm carrier from the base surface, and wherein both the valve chamber and the outer edge section of the sealing diaphragm have an oblong contour, rounded on the narrow sides.

\* \* \* \* \*